US012695652B2

(12) United States Patent
    Cope

(10) Patent No.: US 12,695,652 B2
(45) Date of Patent: Jul. 28, 2026

(54) TRANSMIT SIGNAL SQUELCH AT SYMBOL BOUNDARIES

(71) Applicant: Analog Devices International Unlimited Company, County Limerick (IE)

(72) Inventor: Mark Cope, Bath (GB)

(73) Assignee: Analog Devices International Unlimited Company, County Limerick (IE)

( * ) Notice: Subject to any disclaimer, the term of this patent is extended or adjusted under 35 U.S.C. 154(b) by 58 days.

(21) Appl. No.: 18/825,714

(22) Filed: Sep. 5, 2024

(65) Prior Publication Data

US 2026/0067138 A1     Mar. 5, 2026

(51) Int. Cl.
    *H04L 27/00*          (2006.01)
    *H04L 27/22*          (2006.01)

(52) U.S. Cl.
    CPC .......... *H04L 27/22* (2013.01); *H04L 27/0002* (2013.01)

(58) Field of Classification Search
    CPC ............................ H04L 27/22; H04L 27/0002
    See application file for complete search history.

(56) References Cited

U.S. PATENT DOCUMENTS

| | | | |
|---|---|---|---|
| 6,268,773 B1 | 7/2001 | Matsui | |
| 8,686,757 B2 | 4/2014 | Ng et al. | |
| 8,724,744 B2 | 5/2014 | Gurney et al. | |
| 10,361,898 B2 * | 7/2019 | Jia ..................... | H04L 25/03828 |
| 10,686,407 B2 | 6/2020 | Nomiyama et al. | |
| 11,569,783 B2 | 1/2023 | Nomiyama et al. | |

| | | | |
|---|---|---|---|
| 2007/0072652 A1 | 3/2007 | Shan et al. | |
| 2013/0051449 A1 * | 2/2013 | Georgi .............. | H04L 25/03159 |
| | | | 375/303 |
| 2015/0222344 A1 * | 8/2015 | Guermandi .......... | H04B 1/0475 |
| | | | 375/296 |
| 2022/0407466 A1 | 12/2022 | Zou et al. | |
| 2023/0361731 A1 | 11/2023 | Huang et al. | |
| 2024/0213923 A1 | 6/2024 | Huang et al. | |
| 2024/0405725 A1 | 12/2024 | Sapia et al. | |
| 2025/0015762 A1 | 1/2025 | Cope et al. | |
| 2025/0015769 A1 | 1/2025 | Cope et al. | |
| 2025/0330126 A1 | 10/2025 | Sapia et al. | |
| 2025/0330132 A1 * | 10/2025 | Sapia ..................... | H03F 1/523 |

FOREIGN PATENT DOCUMENTS

| | | |
|---|---|---|
| EP | 3334038 A2 | 6/2018 |
| EP | 3 565 115 A1 | 11/2019 |

OTHER PUBLICATIONS

Gao, "Average Power Tracking Power Amplifier with Multilevel Supply Voltage for Wi-Fi Applications" IEEE Xplore, 2000, in 6 pages.
Triano, Application Report: Basics of Power MUX, Texas Instruments, Revised Oct. 2020, in 13 pages.
Extended European Search Report issued in European Patent Application No. 25198669.1, dated Jan. 19, 2026.

* cited by examiner

*Primary Examiner* — Janice N Tieu
(74) *Attorney, Agent, or Firm* — Knobbe, Martens, Olson & Bear, LLP

(57)          ABSTRACT

Aspects of this disclosure relate to squelching a symbol at a symbol boundary. A transmit squelch block can squelch a portion of a symbol at a symbol boundary. The transmit squelch block can be included in a symbol based envelope tracking system. Transmit squelching can reduce spurious emissions associated a symbol based envelope tracking voltage toggling on a symbol boundary.

20 Claims, 6 Drawing Sheets

1

TRANSMIT SIGNAL SQUELCH AT SYMBOL BOUNDARIES

BACKGROUND

Technical Field

Embodiments of this disclosure relate to squelching a transmit signal at a symbol boundary.

Description of Related Technology

Radio systems can transmit and receive signals in the form of electromagnetic waves having a frequency in range from approximately 30 kilohertz (kHz) to 300 Gigahertz (GHz). Radio systems can be used for wireless communications, such as cellular communications and/or other wireless network communications.

Radio systems that transmit signals often include a power amplifier to amplify a radio frequency (RF) signal for transmission via one or more antennas. Power amplifiers can consume significant power in such systems. Power efficient power amplifiers can be desirable for a variety of applications. Low spectral emissions can be desirable for power amplifier systems.

SUMMARY OF CERTAIN INVENTIVE ASPECTS

The innovations described in the claims each have several aspects, no single one of which is solely responsible for its desirable attributes. Without limiting the scope of the claims, some prominent features of this disclosure will now be briefly described.

One aspect of this disclosure is a system with transmit squelching at symbol boundaries. The system includes a transmit squelch block, a voltage modulator, and a power amplifier. The transmit squelch block is configured to squelch a portion of a symbol corresponding to a symbol boundary to generate a transmit squelch symbol. The voltage modulator is configured to generate an output bias voltage that tracks a root mean square symbol power of a radio frequency signal. The voltage modulator is configured to adjust the output bias voltage on symbol boundaries of the radio frequency signal. The radio frequency signal includes a representation of the transmit squelch symbol. The power amplifier is configured to receive the output bias voltage and to amplify the radio frequency signal.

The transmit squelch block can include all zeros in the portion of the symbol to generate the transmit squelch symbol. The transmit squelch symbol can include a zeroed portion, a cyclic prefix, and a data payload, in which the zeroed portion includes all zeros. In certain applications, the transmit squelch block is configured to include a non-zero value in the portion of the symbol to generate the transmit squelch symbol. The non-zero value can be less than 10% of a maximum value of the portion of the symbol.

The transmit squelch block can be configured to squelch a second portion of a second symbol corresponding to a second symbol boundary, in which the second portion is longer than the portion. The symbol boundary can be associated with an increase in the output bias voltage, and the second symbol boundary can be associated with a decrease in the output bias voltage.

The transmit squelch block can be configured to squelch on all symbol boundaries of a data stream that includes the symbol. The transmit squelch block can be configured to selectively squelch on symbol boundaries of a data stream that correspond to the output bias voltage toggling, in which the data stream includes the symbol.

The system can include a second transmit squelch block, a first digital upconverter, and a second digital upconverter. The second transmit squelch block can be configured to squelch of a portion of a second symbol corresponding to the symbol boundary to generate a second transmit squelch symbol. The second transmit squelch symbol can be associated with a different carrier than the transmit squelch symbol. The first digital upconverter can be configured to upconvert the transmit squelch symbol. The second digital upconverter can be configured to upconvert the second transmit squelch symbol. The radio frequency signal can be a composite signal that includes representations of the transmit squelched symbol and the second transmit squelch symbol. The transmit squelch symbol can have a longer length than the second transmit squelch symbol, and the voltage modulator can be configured to adjust the output bias voltage at symbol boundaries of a first data stream that includes the transmit squelch symbol and to maintain the output bias voltage at symbol boundaries of a second data stream that includes the second transmit squelch symbol that are not aligned with symbol boundaries of the first data stream. The second transmit squelch block can be configured to squelch symbols of the second data stream corresponding to all of the symbol boundaries of the first data stream. The second transmit squelch block can be configured to only squelch symbols of the second data stream corresponding to the symbol boundaries of the first data stream where the output bias toggles.

Another aspect of this disclosure is a transceiver with transmit squelching at symbol boundaries. The transceiver includes a transmit squelch block configured to squelch a portion of a symbol corresponding to a symbol boundary to generate a transmit squelch symbol; and a digital upconverter configured to upconvert the transmit squelch symbol in a digital domain.

The transmit squelch symbol can include a zeroed portion, a cyclic prefix, and a data payload, in which the zeroed portion includes all zeros.

The transmit squelch block can be configured to squelch a data stream that includes the symbol on all symbol boundaries of the data stream. The transmit squelch block can be configured to selectively squelch a data stream on symbol boundaries of the data stream corresponding to a symbol based envelope tracking state changing.

The transmit squelch block can be configured to squelch a second portion of a second symbol corresponding to a second symbol boundary to generate a second transmit squelch symbol, in which the second portion is longer than the portion.

The transmit squelch block can be configured to determine a length of the portion based on a transition between symbol based envelope tracking states.

The transceiver can include a second transmit squelch block configured to squelch a portion of a second symbol corresponding to the symbol boundary, the second symbol being associated with a different carrier than the symbol; and a second digital upconverter having an input coupled to an output of the second transmit squelch block; wherein the transceiver has an output coupled to outputs of the digital upconverter and the second digital upconverter, and wherein the output is configured to provide a composite signal that comprises representations of the transmit squelch symbol and the second transmit squelch symbol. The symbol and the second symbol can have different lengths, in which the symbol is included in a first data stream, the second symbol is included in a second data stream, and the transmit squelch block and the second transmit squelch block are configured to squelch on symbol boundaries of the first data stream that are aligned with symbol boundaries of the second data stream.

Another aspect of this disclosure is a method of radio frequency signal amplification with symbol based envelope tracking with transmit squelch. The method includes toggling an output bias voltage between a plurality of discrete voltage levels on symbol boundaries of a radio frequency signal based on a symbol based envelope tracking state, wherein the output bias voltage is provided to a power amplifier; squelching a portion of a symbol to generate a transmit squelch symbol, wherein the portion of the symbol abuts a boundary of the symbol; and after the squelching, amplifying the radio frequency signal with the power amplifier, wherein the radio frequency signal comprises a representation of the transmit squelch symbol.

For purposes of summarizing the disclosure, certain aspects, advantages and novel features of the innovations have been described herein. It is to be understood that not necessarily all such advantages may be achieved in accordance with any particular embodiment. Thus, the innovations may be embodied or carried out in a manner that achieves or optimizes one advantage or group of advantages as taught herein without necessarily achieving other advantages as may be taught or suggested herein.

BRIEF DESCRIPTION OF THE DRAWINGS

Embodiments of this disclosure will be described, by way of non-limiting example, with reference to the accompanying drawings.

FIG. 1A shows a fixed bias voltage. FIG. 1B shows a symbol based envelope tracking bias voltage. FIG. 1C shows a continuous envelope tracking voltage.

DETAILED DESCRIPTION OF CERTAIN EMBODIMENTS

Figures 1A, 1B, 1C:
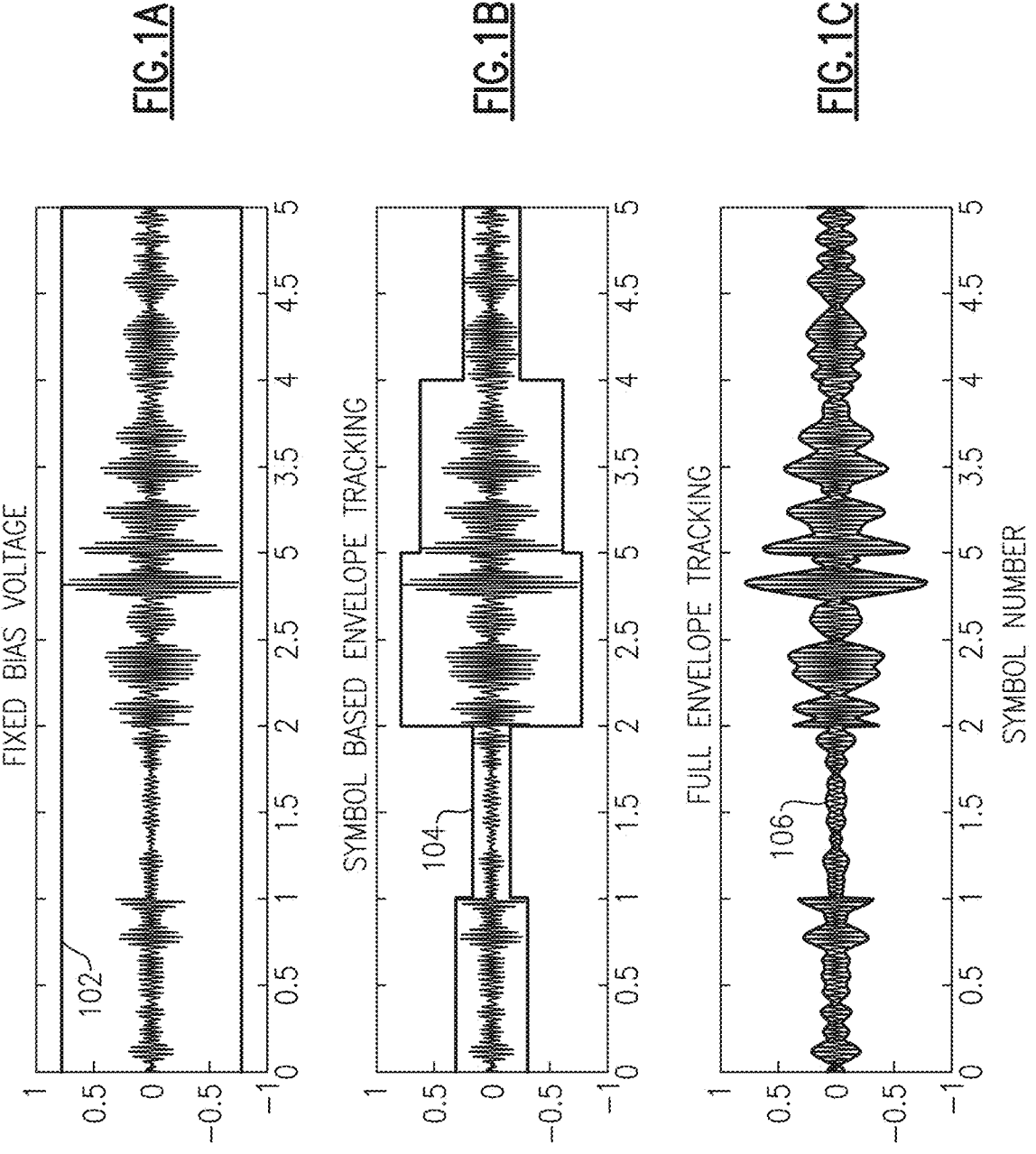
FIGS. 1A, 1B, and 1C are graphs of bias voltages for 5 symbols of a radio frequency signal.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the illustrated elements. Further, some embodiments can incorporate any suitable combination of features from two or more drawings. The headings provided herein are for convenience only and do not necessarily affect the scope or meaning of the claims.

INTRODUCTION

This disclosure relates to transmitter systems in communication networks. Such communication networks can be wireless networks in certain applications. In some other applications, the communications network can be wired. Reducing power consumption in communication networks can be a significant driver in new designs. A radio frequency (RF) power amplifier can consume a significant portion of total power consumption.

Improving efficiency of transmitters in communication systems is often a goal for operators of these systems. Power efficiency can form part of technical specifications for equipment suppliers of the operators. RF power amplifiers can consume a significant fraction of the total power consumed. Symbol based envelope tracking (SBET) is a relatively low complexity solution for reducing power in these systems. SBET can be applicable to most orthogonal frequency-division multiplexing (OFDM) based communication systems.

In SBET, a bias voltage for an RF power amplifier can track a root mean square symbol power of an RF signal being amplified by the RF power amplifier on a symbol-by-symbol basis. The RF power amplifier can include a field effect power amplifier transistor in certain applications. The bias voltage can be provided to a drain of the field effect power amplifier transistor in such applications.

To keep complexity relatively low for SBET, little or no attempt may be made to track and correct for power amplifier behavior when a bias voltage (e.g., drain voltage) of the power amplifier transitions from one voltage level to another voltage level. Such transitions can have a duration in a range from 10 nanoseconds (ns) to 200 ns, for example. This can result in relatively short duration (e.g., around 100 ns) and relatively high amplitude spikes of spurious emissions in the transition. This can contribute a relatively small but measurable amount to the average spurious emissions. The average spurious emissions should typically meet regulatory specifications.

Reducing the magnitude of a transmit signal at and/or near a symbol boundary allows for manipulating aspects of the transmitter system at symbol boundaries with relatively small and/or minimal impact to signal integrity. Without such a reduction in magnitude in the transmit signal, pulses of distortion energy can be transmitted. One transmit parameter that can be changed on a symbol boundary is the drain voltage on the power amplifier. Other parameters that can alternatively or additionally be adjusted at and/or near the symbol boundary include without limitation one or more of gate voltage, crest factor reduction (CFR) thresholds, filter or digital predistortion (DPD) models or configurations parameters.

To reduce a transmit signal in magnitude at and/or near symbol boundaries, digital transmit data can be replaced with zeros at and/or near the symbol boundary. Other relatively small non-zero values (e.g., a non-zero value that is less than 10% of a maximum value of the portion of a symbol being replaced) can replace digital transmit data at and/or near a symbol boundary to achieve a similar effect. Squelching the transmit signal by zeroing and/or significantly reducing the power of a portion of the signal can be performed in combination with one or more other techniques to reduce the magnitude of the transmit signal at and/or near the symbol boundary.

This disclosure relates to technical solutions that can reduce spurious emissions in transitions of a SBET bias voltage. The data of each carrier at and/or near the symbol boundary can be zeroed for a relatively short period of time, for example around 100 ns. This zeroing of the transmit data can cause a relatively small reduction in an effective length of a cyclic prefix of a symbol. Spectral emissions at symbol boundary transitions can be reduced in SBET systems using techniques disclosed herein.

Power Amplifier Bias Voltage

FIGS. 1A, 1B, and 1C are graphs of different bias voltages for a power amplifier for 5 symbols of a radio frequency signal. The bias voltages can be drain voltages for RF power amplifiers that include field effect power amplifier transistors. FIG. 1A shows a fixed bias voltage. FIG. 1B shows a SBET bias voltage. FIG. 1C shows a continuous envelope tracking voltage. FIGS. 1B and 1C graphically illustrate the concept of envelope tracking. The waveform in these graphs represents what a single RF power amplifier transistor is aiming to produce on its output. The waveform is symbol based with symbol boundaries at 0, 1, 2, 3, 4, and 5 on the x axis, which corresponds to time. Hence the root mean square (RMS) power of the waveform can change on every symbol boundary. Symbols can be 10 s of microseconds long in Long Term Evolution (LTE) and New Radio (NR).

If a system has a fixed bias voltage like in FIG. 1A, the bias voltage can support the largest RF peak power for the power amplifier output signal. A fixed bias voltage line 102 is shown in FIG. 1A. This the way a number of cellular wireless base station RF power amplifiers are configured. It is possible that slow changes (seconds or more) of the bias voltage can be achieved to accommodate when the likelihood of high traffic is minimal, such as at night time.

In SBET, the bias voltage (e.g., drain voltage for a field effect power amplifier transistor) may only change on symbol boundaries as shown in the FIG. 1B. The bias voltage can support the maximum peak power within a symbol. This can improve power amplifier efficiency as the same RF power is produced in the symbol but operating at a lower bias voltage shown as an SBET line 104.

FIG. 1C shows an even higher efficiency mode of operation using full envelope tracking. The bias voltage tracks every peak of the waveform envelope in FIG. 1C. As shown in FIG. 1C, a bias voltage curve 106 tracks each peak on the waveform envelope. However, this efficiency gain can come at the expense changing the bias voltage 1000s of times faster than for SBET. This full envelope tracking in FIG. 1C can be an order of magnitude more complex than SBET embodiments disclosed herein and can involve sophisticated DPD and faster analog switches (e.g., gallium nitride (GaN)

switches) than SBET. As the instantaneous bandwidth of the RF signal increases, full envelope tracking can find it difficult or impossible to track every peak and trough. In this case, a full envelope tracking can start skipping troughs to reduce complexity at the cost of losing some efficiency performance. This is different than disclosed embodiments of SBET, where the bias voltage only shifts value on the symbol boundaries. In SBET, the bias voltage can have a generally constant voltage level for an entire symbol while the waveform envelope has multiple peaks and troughs for the symbol.

In the case of NR (Fifth Generation (5G)) mixed numerology carriers, the symbols lengths are shorter for the higher numerologies. In this case, SBET can switch at the symbol boundaries of the highest numerology carrier in some instances. Alternatively, SBET can switch at the symbol boundaries of the lowest numerology carrier in some other instances.

Symbol Based Envelope Tracking with Transmit Squelch

In SBET systems, transmit squelching (e.g., zeroing) can reduce spurious emissions at symbols boundaries. SBET systems can make little or no attempt to track and correct power amplifier behavior when a power amplifier bias voltage transitions from one voltage level to another discrete voltage level for SBET. Transmit squelching significantly reduces the power of a portion of a symbol. Transmit squelching can involve overwriting data of a symbol with zeros at a symbol boundary to reduce spectral emissions associated with a voltage transition of the bias voltage. This can involve overwriting a portion of a cyclic prefix of the symbol with zeros, where the portion of the cyclic prefix that is overwritten abuts the symbol boundary with zeros. In some instances, transmit squelching can involve overwriting a portion of the symbol at a symbol boundary with a non-zero value that is less than 10% of a maximum value of the portion of the symbol in some instances. This can significantly reduce the power of the portion of the symbol at the symbol boundary to reduce spectral emissions associated with the transition of a bias voltage at the symbol boundary. Transmit squelching can be performed independently for each carrier.

Transmit squelching can be performed only on symbol boundaries where the bias voltage toggles. In some other applications, transmit squelching can be performed on all symbols for a data transmission or all symbol boundaries where each carrier of a composite signal aligned with each other. A transmit squelch block can be configured to perform any or all of such transmit squelching.

The duration of overwriting data with zeros can depend on one of more factors. For example, the duration of overwriting data can be different for increasing the bias voltage than decreasing the bias voltage. Increasing the bias voltage from voltage level $V_2$ to voltage level $V_1$ may be faster than decreasing the bias voltage from voltage level $V_1$ to voltage level $V_2$. The period for overwriting data with zeros can be shorter for shorter voltage transition times. As another example, the duration of overwriting data can be different for increasing (or decreasing) the bias voltage by a different amount. Increasing the bias voltage from voltage level $V_2$ to voltage level $V_1$ may be faster than increasing the bias voltage from voltage level $V_3$ to voltage level $V_1$, where voltage level $V_2$ is higher than voltage level $V_3$. The period for overwriting data with zeros can be shorter for voltage transition times with a smaller magnitude voltage transition.

After squelching by overwriting data with zeros, a transmit signal can be filtered in a digital upconverter. This can adjust the zero values to slightly larger values. Benefits of transmit squelching with such filtering can still be significant.

In the case of mixed numerology carriers, it can be beneficial to only switch a bias voltage on a longest symbol carrier boundary. More details regarding mixed numerology carriers and transmit squelching will be discussed herein, for example, with reference to FIGS. 4 and 5.

Transmit squelching can effectively reduce a cyclic prefix period of a symbol. This reduction in cyclic prefix can be relatively small. For example, the cyclic prefix can be reduced by less than 100 ns when cyclic prefix length is in a range from about 1 microsecond ($\mu$s) to 2 $\mu$s.

Transmit squelching can be performed in conjunction with adjusting one or more other parameters at and/or near a symbol boundary. The other parameters can include, but are not limited to, one or more of gate voltage, CFR threshold, filter configurations, or DPD models and/or configurations.

Figure 2:
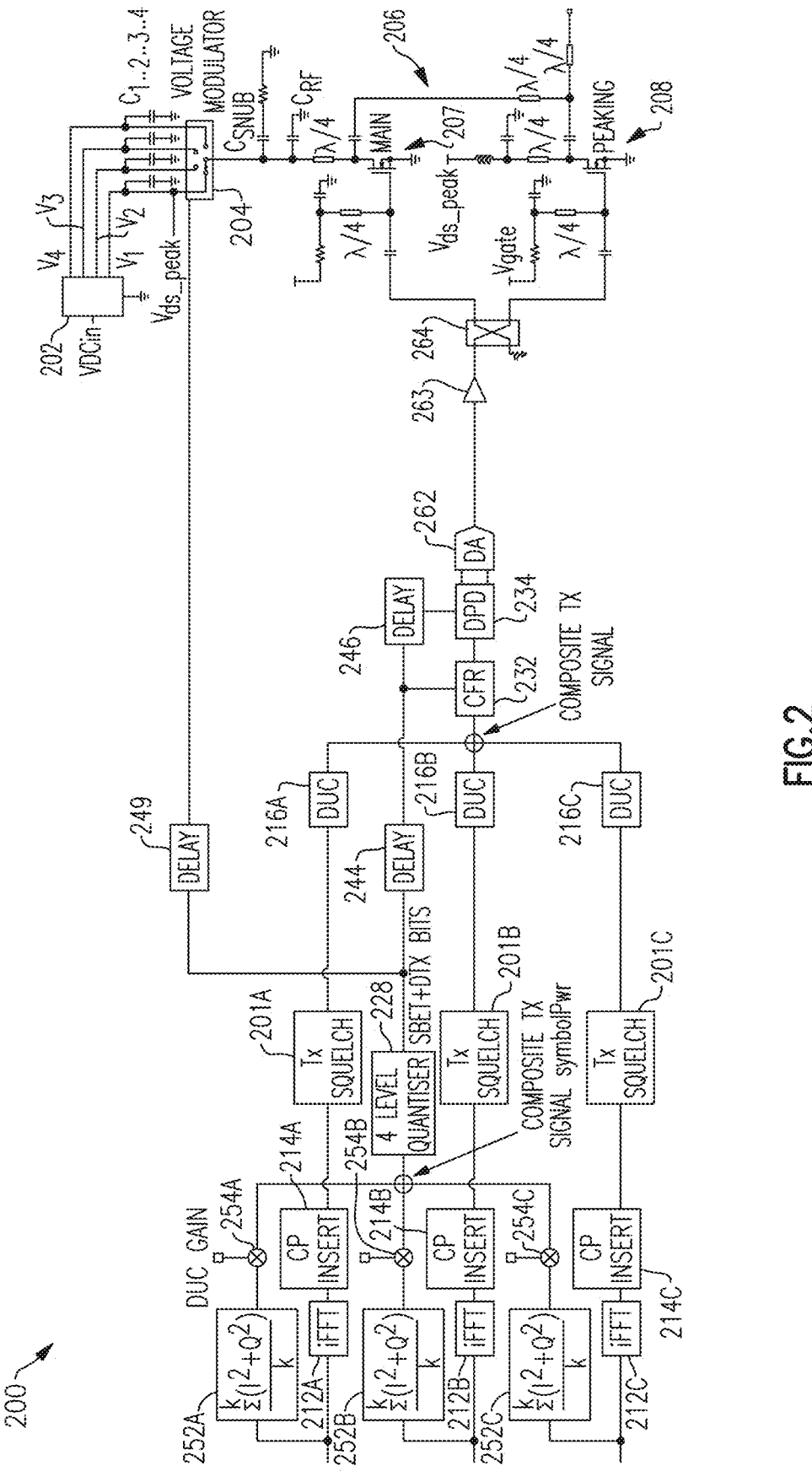
FIG. 2 is a schematic block diagram of a symbol based enveloped tracking system with transmit squelching according to an embodiment.

FIG. 2 is a schematic block diagram of an SBET system 200 with transmit squelching according to an embodiment. The SBET system 200 is a power amplifier system that includes a power amplifier. The SBET system 200 includes transmit squelch blocks 201A, 201B, and 201C to perform transmit squelching. The SBET system 200 also includes other blocks for SBET and generating RF signals for transmission. As illustrated, the SBET system 200 includes a voltage modulator 202, a supply voltage circuit 204, and a power amplifier 206. The SBET system 200 also includes signal paths for a plurality of carriers, processing circuitry to process a composite signal that includes a plurality of carriers, and circuitry for determining an SBET state. The SBET system 200 has 4 SBET voltages that can be selected for a drain of a field effect power amplifier transistor and a waveform that is made up from 3 individual carriers. Any other suitable number of SBET voltages and/or any other suitable number of individual carriers can be used in some other applications.

The voltage modulator 202 can select one voltage from N fixed voltages from the supply voltage circuit 204 to provide the power amplifier 206. In the illustrated power amplifier 206, the selected voltage is provided to a drain of a main power amplifier transistor 207. The selected voltage can also be provided to a drain of a peaking power amplifier transistor 208. Each of the voltages from the supply voltage circuit 204 corresponds to an SBET state 1 to N. There can be any suitable number of SBET states for a particular application. For example, there 4 SBET states in the SBET system 200. In some other applications there are 2 SBET states, 3 SBET states, or 8 SBET states, for example. The voltage modulator 202 can generate an output bias voltage that tracks an envelope of an RF signal on a symbol-by-symbol basis. The output bias voltage can track the envelope of the radio frequency signal for a group of symbols and/or for each individual symbol. The output bias voltage can have a transition time of $10s$ of nanoseconds. In certain applications, the voltage modulator 202 can transition the output bias voltage between discrete voltage levels in a time that is in a range between 5 nanoseconds and 200 nanoseconds. In some applications, the voltage modulator 202 can transition the output bias voltage between discrete voltage levels in a time that is in a range between 5 nanoseconds and 50 nanoseconds. The output bias voltage can be stepped significantly (e.g., from 25 Volts (V) to 50 V) on a symbol boundary.

The SBET system 200 can also have a state, which is called discontinuous transmit (DTX) mode, where there is no RF power to transmit in a symbol. In this case, either no voltage can be connected to common side of the switches (open circuit) or the drain of the power amplifier transistor 207 can be connected via a switch to ground. The power amplifier output bias voltage can be discharged so it approaches zero volts (e.g., ground) in the DTX state. In the DTX state, the RF power amplifier 206 can be off and should draw negligible power.

The voltage modulator 202 can provide a constant voltage for an entire symbol and toggle state on symbol boundaries. The voltage modulator 202 can select from a plurality of discrete voltages (e.g., $V_1$, $V_2$, $V_3$, $V_4$) to provide as the output bias voltage based on SBET state. The voltage modulator 202 can toggle the output bias voltage among these discrete voltages on symbol boundaries. In some applications, the voltage modulator 202 can provide a constant voltage for a group of symbols and change state on symbol boundaries.

In certain applications, the voltage modulator 202 can only switch state on the symbol boundaries of a carrier with the longest symbol period (lowest numerology in NR) when a composite transmit signal includes carriers with different symbol lengths. For instance, in the SBET system 200, if a first carrier has a longer symbol length than the second and third carriers, then a quantizer 228 can determine a SBET state at or near symbol boundaries of the symbols of the first carrier of the composite signal. The maximum RMS power of each individual symbol of the second carrier corresponding to one symbol of the first carrier can be used in determining the SBET state. Similarly, the maximum RMS power of each individual symbol of the third carrier corresponding to one symbol of the first carrier can be used in determining the SBET state. The SBET state can thus be determined and set for the peak RMS power of the composite symbol for the length of the longest length symbol in this example.

The capacitors $C_{RF}$ and $C_{SNUB}$ can be relatively small (e.g., having a capacitance of less than 1 nanofarad) to reduce and/or minimise the switching/settling time of the drain voltage of the power amplifier transistor 207. The capacitors $C_1$ to $C_N$ ($C_1$ to $C_4$ in FIG. 2) can be larger (e.g., microfarad sized) decoupling capacitors.

The fixed voltages $V_1$ to $V_N$ provided by the supply voltage circuit 204 can be selected such that the highest voltage $V_1$ supports the highest peak RF power (typically Ppk(max)=Prms(max)+8 dB approximately) after applying CFR. The lowest voltage $V_N$ (i.e., $V_4$ in FIG. 2) can be limited by the gain reduction caused by lower drain voltage. The lowest voltage $V_N$ can depend on the power amplifier transistor technology. In certain instances, $V_N \approx \frac{1}{2} V_1$ with an approximate 6 dB gain reduction. With too much gain reduction, the benefit of SBET can start to reduce. Each SBET state can have an associated and different CFR threshold level such that each SBET state supports a different RF peak power. In some applications, a subset of SBET states can have different CFR threshold levels to support different RF peak powers.

The intermediate drain voltage levels (e.g., $V_2$ and $V_3$ in FIG. 2) can span between the largest and smallest voltages. There is a trade off in choosing the number of discrete voltages, with more discrete voltages generally corresponding to higher efficiency improvement but at the possible expense of increased cost and board area. A typical range of values for N is from 2 to 4 in certain applications. The voltage modulator 202 can implement the DTX state. In the DTX state, all switches of the voltage modulator 202 can be off or one or more switches can be connected to ground.

In the SBET system 200, carriers can be processed separately before being combined into a composite signal. A first signal path for a first carrier can include an inverse Fast Fourier Transform (iFFT) block 212A, a cyclic prefix (CP) block 214A, the transmit squelch block 201A, and a digital upconverter (DUC) 216A. A second signal path for a second carrier can include a second iFFT block 212B, a second CP block 214B, the second transmit squelch block 201B, and a second DUC 216B. A third signal path for a third carrier can include a third iFFT block 212C, a third CP block 214C, the third transmit squelch block 201C, and a third DUC 216B.

In the SBET system 200, each carrier can be received as a frequency domain signal. A respective iFFT block 212A, 212B, 212C can transform the frequency domain signal for a carrier to the time domain. A respective CP block 214A, 214B, 214C can add a cyclic prefix to the time domain signal for a carrier. The CP can include a copy of an end portion of a data symbol at the beginning of symbol. For example, a time domain signal for a carrier provided by the iFFT block 212A can include 1000 data samples and the CP block 214A can add the last 10 data samples at the beginning of a symbol. In this example, the CP block 214A can output a symbol that includes 1010 samples: a 10 sample CP followed by a 1000 sample data payload, where the last 10 samples of the data payload are the same as the CP. The CP blocks 214A, 214B, 214C can output symbols that include a CP portion and a data portion.

The transmit squelch blocks 201A, 201B, 201C can significantly reduce power of the symbols provided by the CP block 214A, 214B, 214C, respectively, at symbol boundaries. The transmit squelch blocks 201A, 201B, 201C can squelch at the beginning of the CPs of some or all of the symbols. Squelching can involve overwriting a portion of a symbol with zeros. As an example, in a case where the CP includes the last 10 samples of the data payload for a symbol output by the CP block 214A, the transmit squelch block 201A can overwrite the first three samples of the CP with all zeros. This can create a symbol with three zeroed samples, a 7 sample cyclic prefix, and a 1000 sample data payload. Overwriting the beginning of the CP effectively removes the samples farthest from the end of the data payload, leaving the remaining CP to match the end of the data payload. Having zeroed samples at a beginning of a symbol can reduce spectral emissions at a symbol boundary when the voltage modulator 202 toggles the bias voltage for the power amplifier 206 at the symbol boundary.

Each of the transmit squelch blocks 201A, 201B, and 201C can independently operate on a respective carrier. The transmit squelch blocks 201A, 201B, and 201C can be implemented by general purpose processing circuitry configured and/or programmed to perform transmit squelch functionality disclosed herein. For example, a microprocessor can execute instructions to implement the functionality of the transmit squelch blocks 201A, 201B, and 201C. The transmit squelch blocks 201A, 201B, and 201C can be implemented by dedicated circuitry configured to perform transmit squelch functionality disclosed herein. For example, dedicated logic gates can implement the functionality of the transmit squelch blocks 201A, 201B, and 201C.

The duration of squelching (e.g., overwriting data with zeros) can depend on whether the bias voltage provided by the voltage modulator 202 is increasing or decreasing. Increasing the bias voltage from voltage level $V_2$ to voltage level $V_1$ may be faster than decreasing the bias voltage from voltage level $V_1$ to voltage level $V_2$. One or more of the transmit squelch blocks 201A, 201B, and 201C can include logic that determines whether the bias voltage is increasing or decreasing. In certain applications, the transmit squelch blocks 201A, 201B, and 201C can overwrite data with zeros for a shorter period of time for the bias voltage increasing than for the bias voltage decreasing.

The duration of squelching (e.g., overwriting data with zeros) can depend on a magnitude by which the bias voltage provided by the voltage modulator 202 is changing on a symbol boundary. One or more of the transmit squelch blocks 201A, 201B, and 201C can include logic that determines a magnitude by which the bias voltage is changing on a symbol boundary. In certain applications, the transmit squelch blocks 201A, 201B, and 201C can overwrite data with zeros for a shorter period of time for the bias voltage changing by a smaller magnitude than for the bias voltage changing by a larger magnitude.

A transition in SBET state can be indicative of (1) whether the bias voltage is increasing or decreasing on a symbol boundary and (2) an amount by which the bias voltage is changing on the symbol boundary. The duration of overwriting data with zeros can depend on (1) whether the bias voltage is increasing or decreasing on a symbol boundary and (2) an amount by which the bias voltage is changing on the symbol boundary. One or more of the transmit squelch blocks 201A, 201B, and 201C can include logic that determines a direction and a magnitude that the bias voltage changes on a symbol boundary. In certain applications, the transmit squelch blocks 201A, 201B, and 201C can overwrite data with zeros based on (1) the direction and (2) the magnitude by which the bias voltage changes on a symbol boundary. The duration of overwriting data with zeros can alternatively or additionally depend on one or more other suitable factors.

The DUCs 216A, 216B, 216C can digitally upconvert signals provided by the transmit squelch blocks 201A, 201B, 201C, respectively. Each of the DUCs 216A, 216B, 216C can apply a filter to a respective data stream provided by a transmit squelch block 201A, 201B, 201C. The filtering can smooth out discontinuities in data. For example, filtering by the DUC 216A and smooth a discontinuity at a symbol boundary between consecutive symbols received by the DUC 216A. With transmit squelching, there can be a discontinuity at the beginning and end of each squelch. The filtering by the DUC 216A can smooth the discontinuity at the end of a squelch. With this extra discontinuity, the DUC 216A can include a filter to handle both discontinuities. Such a filter can be more efficient and/or have higher rejection than a filter that only handles a single discontinuity associated with a symbol boundary. In certain embodiments, the DUCs 216A, 216B, 216C can each include a finite impulse response (FIR) filter that includes additional taps relative to a similar DUC in a system without transmit squelching. Output signals of the DUCs 216A, 216B, 216C can be combined to form the composite transmit signal.

The composite transmit signal can be processed based on SBET state. In the SBET system 200, the SBET state is represented by the SBET+DTX bits that are output from a quantizer 228. The quantizer 228 is a 4 level quantizer in FIG. 2 because there are 4 SBET voltages provided by the voltage modulator 202. In some other applications, the quantizer 228 can be a N level quantizer, where N is a positive integer greater than 1 and N corresponds to a number of different supply voltages provided to the voltage modulator 202. The SBET+DTX bits can change state on symbol boundaries. The bits that represent the SBET state can be delayed appropriately so that these bits arrive at a CFR block 232, a DPD block 234, and the voltage modulator 202 and change to their configuration for the new SBET state as the corresponding transmit data passes through the SBET system 200 (in the case of the voltage modulator 202 the transmit data is an analog signal passing through the field effect transistors of the power amplifier 206). Delay blocks 244, 246, and 249 can provide such delays for the SBET state bits.

The SBET state can be determined by effectively calculating the composite transmit RMS signal power of each complete symbol at an input to the CFR block 232. The quantizer 228 can determine the composite transmit RMS signal power. The composite transmit signal can be formed from a plurality of carriers. Outputs of the DUCs 216A, 216B, 216C can be combined to form the composite transmit signal provided to the CFR block 232.

Calculating transmit power directly at the input of the CFR block 232 may not be ideal as it can take many microseconds at least (and ideally the whole symbol) to get an accurate result. Such a calculation can be ready too late as it can be desirable for the composite transmit RMS signal symbol power to be known at the start of the symbol not the end. While 10 s of microseconds of delay can be added to the transmit signal path to compute transmit power at the input of the CFR block 232, such a delay is generally not desirable.

Another approach is to calculate the symbol power of each carrier multiplied by the individual carrier dependent gain from an iFFT input to a CFR input, then sum the individual carrier powers together. In the SBET system 200, iFFT gain blocks 252A, 252B, and 252C and multipliers 254A, 254B, and 254C can create a composite transmit signal symbol Pwr at the input to the quantizer 228, where the composite transmit signal symbol Pwr has a power corresponding to the composite transmit signal at an input of the CFR block 232. The iFFT gain blocks 252A, 252B, and 252C can provide gains corresponding to the iFFT blocks 212A, 212B, and 212C. The gain applied to in each multiplier 254A, 254B, and 254C can correspond to a gain of a corresponding DUC of the DUCs 216A, 216B, and 216C that form the composite transmit signal that is input to the CFR block 232. Processing the frequency domain data rather than time domain data can result in the symbol power information being available before the symbol boundary of the compositive transmit signal is provided to the input of the CFR block 232.

The quantizer 228 can determine an SBET state based on the composite transmit signal symbol Pwr it receives. The quantizer 228 can be preprogramed with N thresholds in a thermometer fashion and output the SBET state as a number from 1 to N. In the SBET system 200, N equals 4. The DTX bit can be a special condition when the symbol power is zero (or near zero) and can be used disable all switches, so the common switch node of the voltage modulator 202 is open circuit or using an additional switch short the drain of the power transistor 207 to ground.

The CFR threshold used to limit the peak power of the digital signal can be a function of the SBET state. In the SBET system 200, the SBET state feeds into a CFR block 232 after a matching delay. As shown in FIG. 2, the quantizer 228 can output the SBET state and a delay block 244 can add the matching delay so that the SBET state received by the CFR block 232 corresponds to the input signal to the CFR block 232. The CFR block 232 can adjust the CFR threshold based on the SBET state. Accordingly, the CFR threshold can correspond to the output bias voltage provided by the voltage modulator 202 to the power amplifier 206. The CFR block 232 can be implemented by any suitable circuitry. Digital circuitry of a digital signal processor can implement the CFR block 232. A transceiver integrated circuit can implement the CFR block 232, for example.

Adjusting a CFR threshold based on SBET state can be significant to the energy saving performance of SBET system 200. By having a different CFR threshold for each SBET state (e.g., drain voltage), the peak RF power can be defined for each SBET level. The lower the CFR threshold, the greater the possible energy saving but the higher the typical signal distortion and error vector magnitude (EVM), which in turn should raise the Bit Error Rate (BER). A compromise is to ensure that the peak-to-average power ratio (PAR) of any symbol in any SBET state remains greater than or equal to a threshold value. An example threshold value is 8 decibels (dB).

The SBET system 200 can include the DPD block 234 to compensate for non-linearity of the power amplifier 206. The DPD block 234 is a DPD system. The DPD block 234 can include a DPD actuator and a DPD adaptation circuit. For the power amplifier 206, the RF power amplifier non-linearity response can be a function of drain voltage. Accordingly, the DPD performed by the DPD block 234 can also be a function of SBET state. In the SBET system 200, SBET state feeds into the DPD block 234 after a matching delay. As shown in FIG. 2, the quantizer 228 can output a SBET state and delay blocks 244 and 246 can add the matching delay so that the SBET state received by the DPD block 234 corresponds to the input signal to the DPD block 234.

DPD can be adjusted based on the SBET state. Adjusting DPD can involve adjusting DPD coefficients and/or adjusting a DPD actuator. In certain implementations, the DPD model coefficients can be switched on the symbol boundary. Alternatively or additionally, a DPD actuator can be adjusted by enabling and/or disabling certain functionality and/or by adjusting topology of the DPD actuator. This can adjust a DPD model to correspond to an SBET state. The model can be adjusted, for example, by adjusting connections of signal paths in a DPD actuator that include non-linear gain blocks (e.g., lookup tables) and/or by adjusting connections of an artificial neural network in a DPD actuator. Each SBET state or output bias voltage level can have its own DPD model/coefficients, which can switch simultaneously in one clock cycle as the symbol data boundary passes through the DPD block 234.

To simplify the DPD implementation, little or no effort may be made to accurately correct for power amplifier distortion during the switchover transition when the drain voltage is between the two set voltages. The switchover duration can be reduced and/or minimised to 10 s of nanoseconds to reduce spectral distortion contribution of switchover on average. Transmit squelching disclosed herein can also reduce spectral distortion associated with switchover transitions.

An output of the DPD block 234 can be provided to a digital-to-analog converter (DAC) 262 to generate an analog transmit signal. The DAC 262 generates an analog output signal from a digital input signal. The analog signal from by the DAC 262 can be amplified by amplifier 263, and split by a hybrid splitter 264. The hybrid splitter 264 can provide an RF signal to a main power amplifier transistor 207 and a peaking power amplifier transistor 208 of the power amplifier 206. The hybrid splitter 264 can also provide a phase shift such that there is a 90 degree phase shift between the output signals provided by the hybrid splitter 264. The power amplifier 206 of the SBET system 200 is a Doherty power amplifier as illustrated.

The power amplifier 206 can amplify a RF signal that includes representations of transmit squelch symbols provided by the transmit squelch blocks 201A, 201B, and 201C. The representations of the transmit squelch symbols are processed versions of the transmit squelch symbols in the analog domain. Processing including digital upconversion, combining, crest factor reduction, DPD, and digital-to-analog conversion in the SBET system 200 can be performed on the transmit squelch symbols to generate the RF signal.

Figure 3:
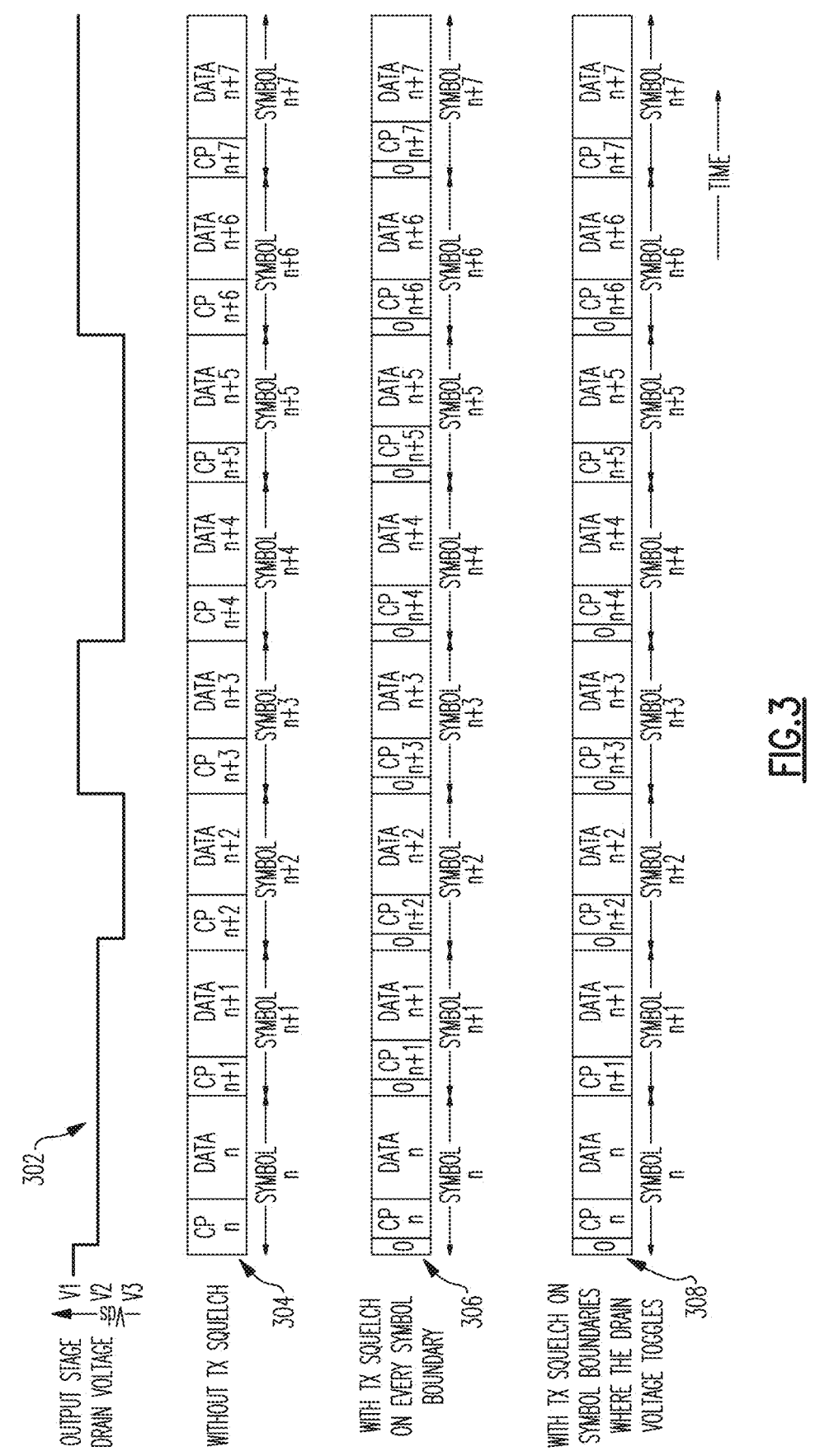
FIG. 3 is a timing diagram of bias voltage versus data streams, including an example transmit data stream without transmit squelching, an example transmit data stream with transmit squelching on each symbol boundary according to an embodiment, and an example transmit data stream with selective transmit squelching on symbol boundaries where the bias voltage toggles.

FIG. 3 is a timing diagram of bias voltage versus data streams with and without transmit squelching. The timing diagram is for 8 consecutive signals of a transmit data stream where an SBET drain voltage toggles between 3 voltage levels. The data streams in FIG. 3 are for 1 carrier.

FIG. 3 includes an output stage drain voltage waveform 302 that shows a bias voltage provided to a drain of a field effect power amplifier transistor. The output stage drain voltage waveform 302 can correspond to an output voltage provided by the voltage modulator 202 of FIG. 2. The field effect power amplifier transistor can correspond to the main power amplifier transistor 207 of FIG. 2. The output stage drain voltage has 3 discrete voltage levels $V_1$, $V_2$, and $V_3$. The discrete voltage levels correspond to SBET states. The output stage drain voltage waveform 302 can correspond to a SBET system with 3 SBET states or an SBET system with more than 3 SBET states in which 3 SBET states correspond to the illustrated data streams.

A first data stream 304 in FIG. 3 corresponds to transmit data without transmit squelching. Each symbol n to n+7 of the first data stream 304 includes a cyclic prefix and a data payload. The first data stream 304 can be provided to a transmit squelch block, such as the transmit squelch block 201A of FIG. 2 for example.

A second data stream 306 in FIG. 3 corresponds to transmit data with transmit squelching on each symbol boundary. In certain embodiments, the second data stream 306 can be output from the transmit squelch block 201A of FIG. 2, for example. An RF signal amplified by a power amplifier, such as the power amplifier 206 of FIG. 2, can include a representation of the symbols of the second data stream 306. Each Symbol n to n+7 of the second data stream 306 includes a zeroed portion, a cyclic prefix, and a data payload. In these symbols, the zeroed portions correspond to symbols boundaries. In particular, the zeroed portions abut symbol boundaries. Symbols n to n+7 of the second data stream 306 include a relatively short period at the symbol boundary with transmit squelching. The relatively short period can be in a range from approximately 10 ns to 200 ns. Data at and near the symbol boundary can be overwritten with 0 s. This can reduce the power of the symbol at the symbol boundary and, consequently, lower spurious spectral emissions at the symbol boundary when the drain voltage toggles between discrete voltage levels in SBET. The symbols of the second data stream 306 have a shorter cyclic prefix than symbols of the first data stream 304.

A third data stream 308 in FIG. 3 corresponds to transmit data with selective transmit squelching on symbol boundaries where the output stage drain voltage waveform 302 toggles between voltage levels. In certain embodiments, the third data stream 308 can be output from the transmit squelch block 201A of FIG. 2, for example. An RF signal amplified by a power amplifier, such as the power amplifier 206 of FIG. 2, can include a representation of the symbols of the third data stream 308. For the third data stream 308, transmit squelching can be performed only at symbol boundaries where the output stage drain voltage toggles. Some symbols of the third data stream 308 include a zeroed portion, a cyclic prefix, and a data payload and other symbols of the third data stream 380 include a cyclic prefix and a data payload. Symbols n, n+2, n+3, n+4, and n+6 of the third data stream 308 include a zeroed portion corresponding to the output stage drain voltage changing at the beginning of these symbols. The output stage drain voltage remains at the same voltage level at t the beginning of Symbols n+1, n+5, and n+7 of the third data stream 308, and these symbols only include a cyclic prefix and data payload.

Transmit squelching in accordance with any suitable principles and advantages disclosed herein can be performed in conjunction with adjusting gate voltage and/or one or more other parameters to reduce a magnitude of a transmit signal, such as CFR threshold, filter configurations, and/or DPD parameters.

In certain applications, transmit squelching can be applied to transmitting a composite signal that includes a plurality of carriers where at least two of the carriers have different symbol lengths. In at least some such applications, a voltage modulator can toggle a SBET bias voltage for a power amplifier only on symbol boundaries of symbols having the longest period, which can be referred to as lowest numerology symbols in 5G specifications.

As an example, a composite signal can include carriers 1, 2, and 3, where carriers 1 and 2 are at a lower numerology than carrier 3. At points in time where symbols associated with carriers 1, 2 and 3 are aligned and begin with a cyclic prefix, transmit squelching can be performed. P(c,s) can be the power of carrier c at symbol s. Psum(s) can be the sum of carrier power at symbol s, where s in Psum(s) is the symbol number at the longest symbol period. In the three carrier example, Psum(0)=P(1, 0)+P(2, 0)+max(P(3, 0), P(3, 1)). For symbol n in the example, Psum(n)=P(1, n)+P(2, n)+max(P(3, 2n), P(3, 2n+1)). Zeros can be inserted in symbols for transmit squelching at the longest symbol boundaries. This transmit squelching can be performed on each symbol boundary where symbols for carriers 1, 2, and 3 are aligned. In certain applications, zeros can be selectively inserted on the longest symbol boundaries where symbols from carriers 1, 2, and 3 align when the drain voltage toggles from one voltage level to a different voltage level.

In another example, a composite signal can include carrier 1, 2, and 3, where carrier1 is numerology 0, carrier 2 is numerology 1, and carrier 3 is numerology 2. In this example, Psum(n)=P(1, n)+max(P(2, 2n), P(2, 2n+1))+max (P(3, 4n), P(3, 4n+1), P(3, 4n+2), P(3, 4n+3)). Transmit squelching can be performed on all symbol boundaries where symbols for carriers 1, 2, and 3 align in some applications. Transmit squelching can be selectively performed on symbol boundaries where symbols for carriers 1, 2, and 3 align and the SBET bias voltage provided by a voltage modulator toggles in certain applications. In some instances, a transmitter can be configurable to (1) perform transmit squelching on all symbols boundaries where symbol boundaries of carriers align in some instances and (2) perform transmit squelching on only on symbols boundaries where the SBET voltage provided by a voltage modulator toggles and where symbol boundaries of carriers align in some other instances.

Figure 4:
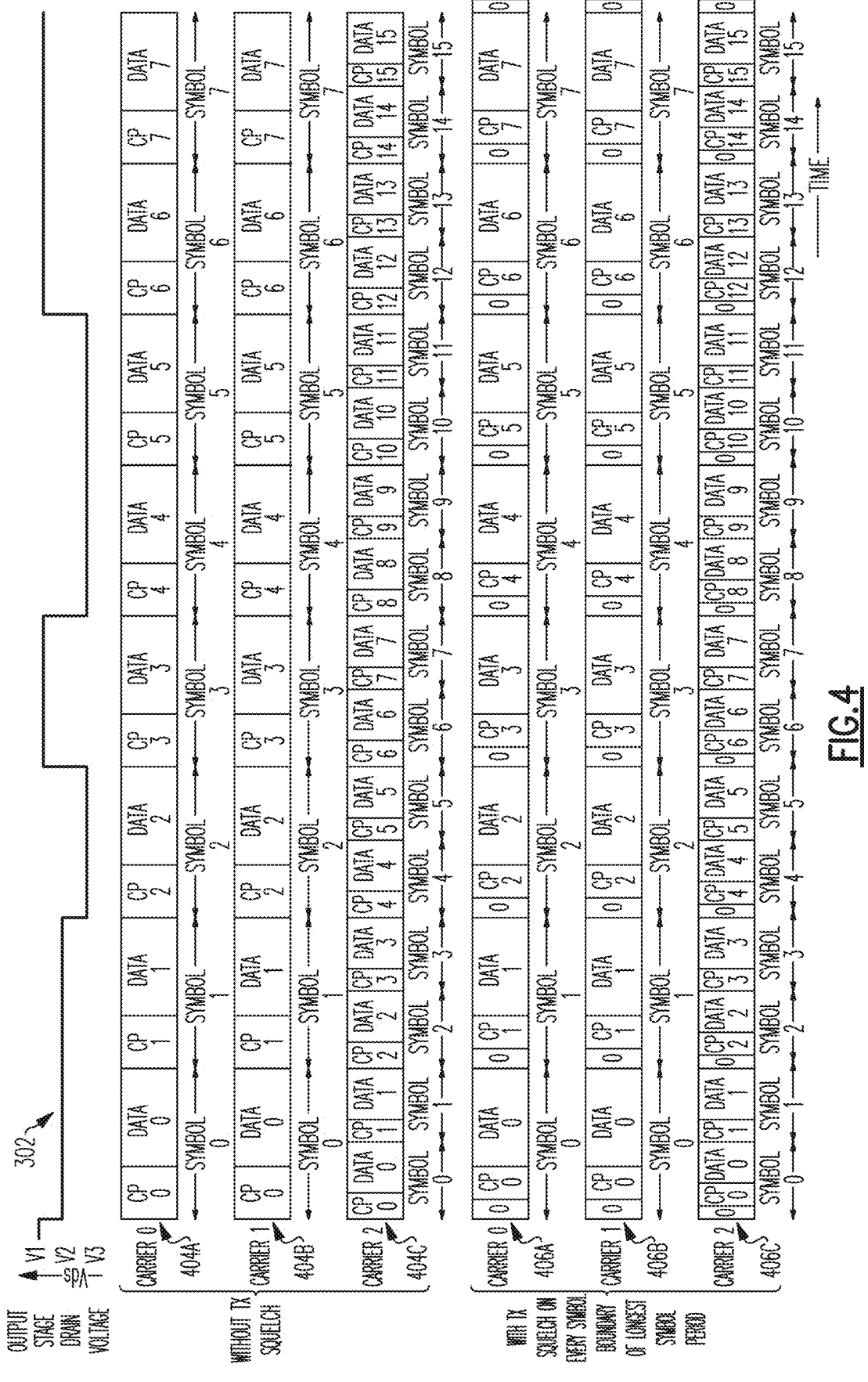
FIG. 4 is a timing diagram of bias voltage versus multicarrier data streams with mixed numerology. The multicarrier data streams include a first multicarrier data stream without transmit squelching and a second multicarrier data stream with transmit squelching on every symbol boundary of a longest period symbol according to an embodiment.

FIG. 4 is a timing diagram of bias voltage versus multi-carrier data streams with mixed numerology with and without transmit squelching at symbol boundaries. The multi-carrier data streams include a first multicarrier data stream without transmit squelching and a second multicarrier data stream with transmit squelching on every symbol boundary of a longest period symbol according to an embodiment. The timing diagram is for transmit data streams for 3 carriers where an SBET drain voltage toggles between 3 voltage levels. FIG. 4 includes the same output stage drain voltage waveform 302 as FIG. 3.

The first multicarrier data stream includes first data streams 404A, 404B, and 404C associated with carrier 0, carrier 1, and carrier 2, respectively. The first data streams 404A, 404B, and 404C can be received by the transmit squelch blocks 201A, 201B, and 201C, respectively, of FIG. 2 in certain embodiments. Symbols associated with carriers 0 and 1 have twice the symbol length as symbols associated with carrier 2. There are two times the number of symbols associated with carrier 2 in the data stream 404C compared to the number of symbols associated with carrier 0 and carrier 1 in each of the data streams 404A and 404B, respectively. The symbols in the first data streams 404A, 404B, and 404C each include a cyclic prefix and a data payload.

The second multicarrier data stream includes second data streams 406A, 406B, and 406C associated with carrier 0, carrier 1, and carrier 2, respectively. The second data streams 406A, 406B, and 406C can be output by the transmit squelch blocks 201A, 201B, and 201C, respectively, of FIG. 2 in certain embodiments. Transmit squelching can be performed on symbol boundaries of the longest symbols of the second multicarrier data streams. FIG. 4 corresponds to transmit squelching being performed on all boundaries of symbols of the second data streams 406A and 406B and every other symbol boundary of symbols of the second data stream 406C. The symbols of the second data streams 406A and 406B each include a zeroed portion, a cyclic prefix, and a data payload. Half of symbols of the second data stream 406C include a zeroed portion, a cyclic prefix, and a data payload and the other half of the symbols of the second data stream 406C include only a cyclic prefix and a data payload. Zeroed portion of symbols of each of the second data streams 406A, 406B, and 406C can be aligned with each other in time.

Figure 5:
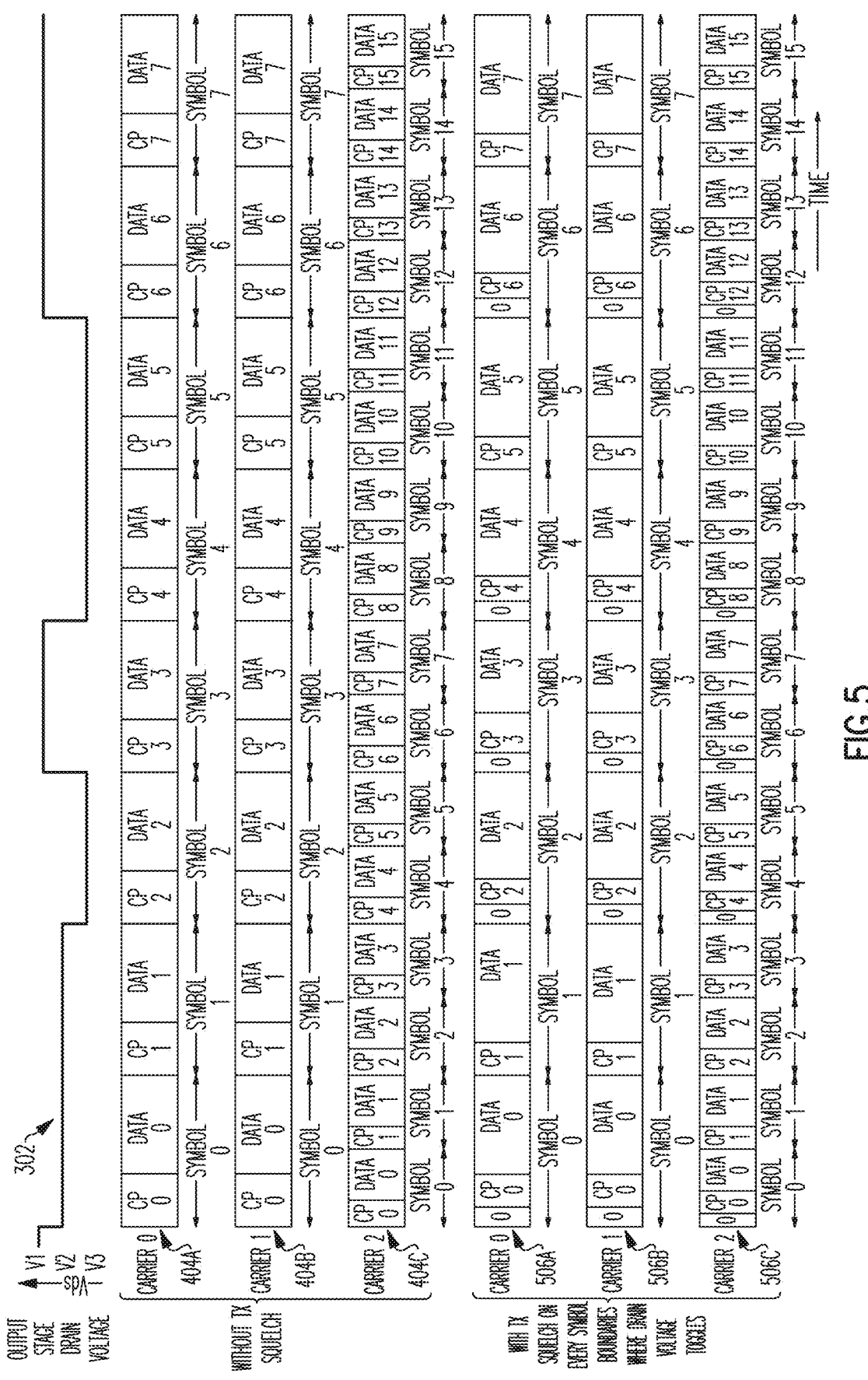
FIG. 5 is another timing diagram of bias voltage versus multicarrier data streams with mixed numerology. The multicarrier data streams include a first multicarrier data stream without transmit squelching and a second multicarrier data stream with selective transmit squelching on symbol boundaries of a longest period symbol where the bias voltage toggles according to an embodiment.

FIG. 5 is another timing diagram of bias voltage versus multicarrier data streams with mixed numerology. The multicarrier data streams include a first multicarrier data stream without transmit squelching and a second multicarrier data stream with transmit squelching on symbol boundaries of a longest period symbol where the bias voltage toggles according to an embodiment. The timing diagram is for transmit data streams for 3 carriers where an SBET drain voltage toggles between 3 voltage levels. FIG. 4 includes the same output stage drain voltage waveform 302 as FIG. 3 and the same first data streams 404A, 404B, and 404C as FIG. 4.

The second multicarrier data stream in FIG. 5 includes second data streams 506A, 506B, and 506C associated with carrier 0, carrier 1, and carrier 2, respectively. The second data streams 506A, 506B, and 506C can be output by the transmit squelch blocks 201A, 201B, and 201C, respectively, of FIG. 2 in certain embodiments. Transmit squelching can be selectively performed on symbol boundaries of the longest symbols of the second multicarrier data stream such that transmit squelching only occurs on such symbol boundaries where the output stage drain voltage toggles. Each of second data streams 506A, 506B, and 506C include some signals with zeroed portions corresponding to the output stage drain voltage toggling and symbols of all of these data streams being aligned. Each of second data streams 506A, 506B, and 506C include some symbols without zeroed portions.

Figure 6:
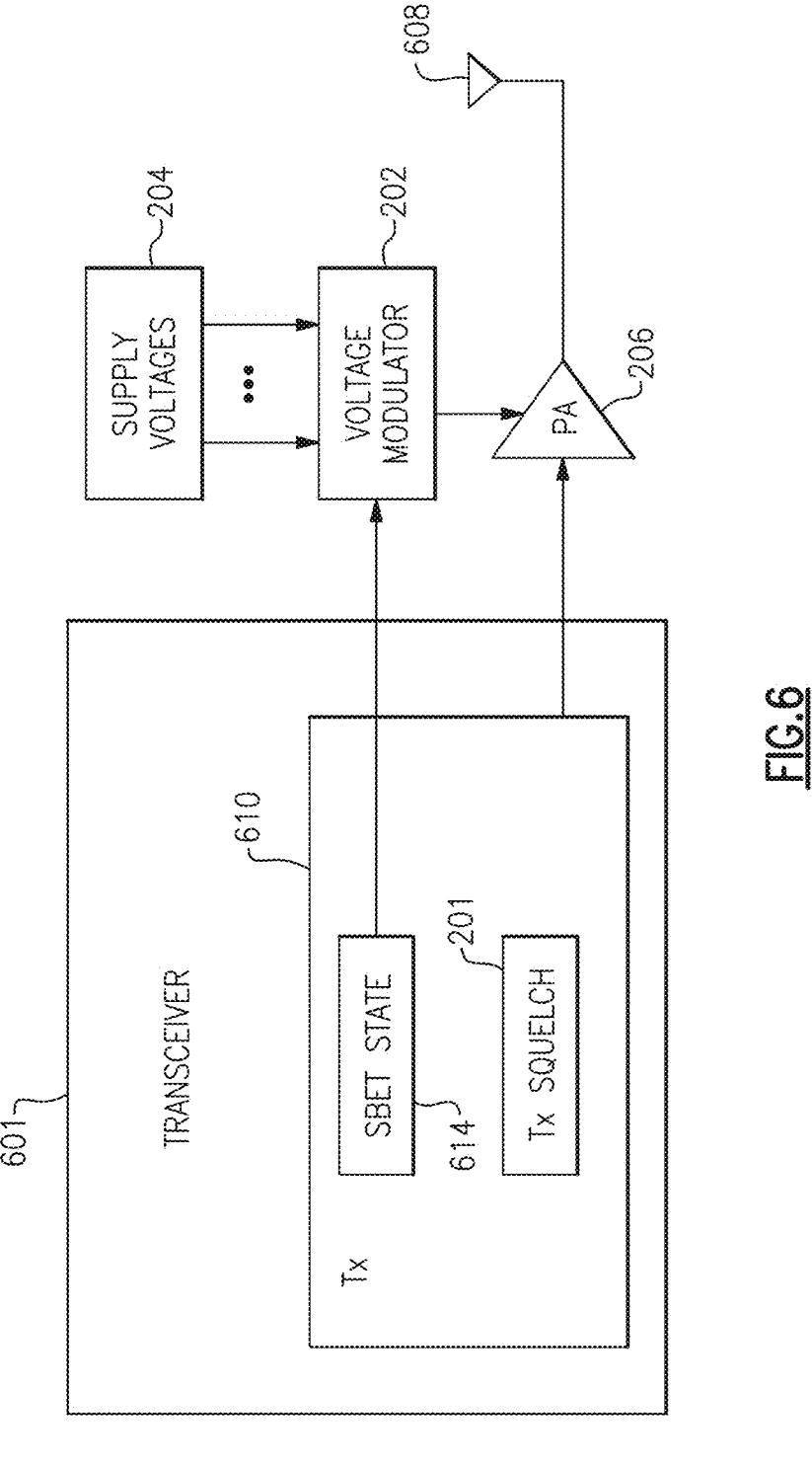
FIG. 6 is a schematic block diagram of a symbol based enveloped tracking system with transmit squelching according to an embodiment.

FIG. 6 is a schematic block diagram of a SBET system 600 with transmit squelching according to an embodiment. As illustrated, the SBET system 600 include a transceiver 601, a voltage modulator 202, a supply voltage circuit 204, a power amplifier 206, and an antenna 608.

The transceiver 601 can provide a SBET state signal to the voltage modulator 202. The voltage modulator 202 can select one voltage from a plurality of supply voltages from the supply voltage circuit 204 to provide the power amplifier 206. The voltage modulator 202 can toggle the supply voltage for the power amplifier 206 on symbol boundaries for SBET. The power amplifier 206 can amplify an RF signal provided by the transceiver 601. The antenna 608 can wirelessly transmit the amplified RF signal provided by the power amplifier 206.

The transceiver 601 can include a transmitter 610. The transceiver 601 can also include a receiver (not illustrated in FIG. 6). The transmitter 610 can include the circuit blocks of the SBET system 200 that provide a control signal to the voltage modulator 202 and that provide the RF signal to the amplifier 263. The transmitter 610 include a transmit squelch block 201 and an SBET state block 614. The SBET state block 614 can determine an SBET state of the SBET system 600. The SBET state block 614 can control the voltage modulator 202 to implement SBET. The SBET state block 614 can include the quantizer 228 of FIG. 2, for example.

The transmit squelch block 201 can squelch a portion of a symbol of a data stream corresponding to a symbol boundary of the data stream to generate a transmit squelch symbol. The portion of the symbol can be the beginning of a cyclic prefix of the symbol. The squelch significantly reduces the power of the portion of the symbol. The squelch can involve overwriting the portion of the symbol with all zeros. For such a squelch, the transmit squelch symbol includes a zeroed portion with all zeros, a cyclic prefix that is shorter than a cyclic prefix of the symbol, and a data payload. The squelch can involve overwriting the portion of the symbol with at least zeros for most significant bits such that the portion of the symbol has less than 10% of a maximum power of the portion of the symbol. For such a squelch, the transmit squelch symbol includes a reduced power portion, a cyclic prefix that is shorter than a cyclic prefix of the symbol, and a data payload.

The transmit squelch block 201 can adjust the length of the squelch based on a transition between SBET states. The length of the squelch can be based on a direction and/or a magnitude by which the output supply voltage provided by the voltage modulator 202 changes on a symbol boundary right before the squelch. The direction and/or magnitude can be determined from a transition between two SBET states. The transmit squelch block 201 can squelch for a longer period for symbols associated with falling edges of the output supply voltage provided by the voltage modulator 202 than for symbols associated with rising edges of the output supply voltage provided by the voltage modulator 202. The transmit squelch block 201 can squelch for a longer period for symbols associated with a larger change in the output supply voltage provided by the voltage modulator 202 than for symbols associated with a smaller change in the output supply voltage provided by the voltage modulator 202.

The transmit squelch block 201 can squelch on every symbol boundary of the data stream in some applications. The transmit squelch block 201 can selectively squelch on every symbol boundary where the output supply voltage provided by the voltage modulator 202 changes in certain applications.

The transmit squelch block 201 can be one of a plurality of transmit squelch blocks of the transceiver 601, where each of the transmit squelch blocks is configured to independently squelch symbols of a respective data stream associated with a different carrier of a composite signal. The transmitter 610 can upconvert transmit squelch symbols from each of the transmit squelch blocks in the digital domain. The composite signal can be formed from output signals of digital upconverters of the transmitter 610. The transceiver 601 can convert the composite signal from a digital signal to an analog composite signal using a digital-to-analog converter. The analog composite signal can be provided to an output contact of the transceiver 601. The analog composite signal can be amplified by the power amplifier 206. The amplified analog composite signal can be transmitted by the antenna 608.

CONCLUSION

In the embodiments described above, apparatus, systems, and methods for power amplifier envelope trackers are described in connection with particular embodiments. It will be understood, however, that the principles and advantages of the embodiments can be used for any other systems, apparatus, or methods with a need for envelope tracking.

Although embodiments disclosed herein may be discussed with reference to power amplifier field effect transistors and modulating a drain voltage for symbol based envelope tracking, any suitable principles and advantages disclosed herein can be implemented with power amplifiers having a different type of power amplifier transistor output stage. In some applications, a power amplifier in a symbol based envelope tracking system in accordance with any suitable principles and advantages disclosed herein can include without limitation field effect transistors, complementary metal oxide semiconductor (CMOS) transistors, a bipolar transistor, a heterojunction bipolar transistor, or the like. Where a power amplifier includes a bipolar power amplifier transistor, symbol based envelope tracking can modulate a bias voltage at a collector of the bipolar power amplifier transistor and/or any other suitable teachings applied to a drain can be applied to a collector. A power amplifier transistor can be implemented by any suitable transistor technology for a particular application. Example power amplifier transistors can include, but are not limited to, gallium nitride (GaN) transistors, silicon transistors, silicon-on-insulator transistors, silicon germanium (SiGe) transistors, gallium arsenide (GaAs) transistors, silicon carbide (SiC) transistors, indium phosphate (InP) transistors, or the like. Moreover, any of the power amplifier transistors disclosed herein can be implemented by two or more power amplifier transistors. Furthermore, any suitable power amplifier topology can be implemented.

Although embodiment disclosed herein may be discussed with reference to certain communications standards, any suitable principles and advantages disclosed herein can be implemented with radio frequency systems that transmit a radio frequency signal via one or more antennas according to any suitable wireless communication standard. In some applications, a radio frequency system with symbol based envelope tracking in accordance with any suitable principles and advantages disclosed herein can generate signal according to any suitable wireless communication standard, such as a Wi-Fi standard, another local wireless area network standard, a personal wireless area network standard, a future cellular technology standard, or the like.

The principles and advantages described herein can be implemented in various apparatuses. Examples of such apparatuses can include, but are not limited to, communications infrastructure such as wireless or wired communications infrastructure, consumer electronic products, parts of the consumer electronic products, electronic test equipment, vehicular electronic products, industrial electronic products, etc. Electronic products can include, but are not limited to, base stations such as cellular base stations, access points, repeaters, relays, wireless communication devices, a mobile phone (for example, a smart phone), a hand-held computer, a tablet computer, a laptop computer, a wearable computing device, a vehicular electronics system, a radio, a wearable health monitoring device, an Internet of Things (IoT) device, etc. Further, apparatuses can include unfinished products.

Unless the context clearly requires otherwise, throughout the description and the claims, the words "comprise," "comprising," "include," "including," and the like are to be construed in an inclusive sense, as opposed to an exclusive or exhaustive sense; that is to say, in the sense of "including, but not limited to." The words "coupled" or connected", as generally used herein, refer to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the Detailed Description using the singular or plural number may also include the plural or singular number, respectively. The words "or" in reference to a list of two or more items, is intended to cover all the following interpretations of the word: any of the items in the list, all the items in the list, and any combination of the items in the list. All numerical values provided herein are intended to include similar values within a measurement error.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states.

The teachings of the inventions provided herein can be applied to other systems, not necessarily the systems described above. The elements and acts of the various embodiments described above can be combined to provide further embodiments. The acts of the methods discussed herein can be performed in any order as appropriate. Moreover, the acts of the methods discussed herein can be performed serially or in parallel, as appropriate.

While certain embodiments of the inventions have been described, these embodiments have been presented by way of example only and are not intended to limit the scope of the disclosure. Indeed, the novel methods and systems described herein may be embodied in a variety of other forms. Furthermore, various omissions, substitutions, and changes in the form of the methods and systems described herein may be made without departing from the spirit of the disclosure. For example, while the disclosed embodiments are presented in given arrangements, alternative embodiments may perform similar functionalities with different components and/or circuit topologies, and some elements may be deleted, moved, added, subdivided, combined, and/ or modified. Each of these elements may be implemented in a variety of different ways as suitable. Any suitable combination of the elements and acts of the various embodiments described above can be combined to provide further embodiments. The accompanying claims and their equivalents are intended to cover such forms or modifications as would fall within the scope and spirit of the disclosure. Accordingly, the scope of the present inventions is defined by reference to the claims.

What is claimed is:

1. A system with transmit squelching at symbol boundaries, the system comprising:

a transmit squelch block configured to squelch a portion of a symbol corresponding to a symbol boundary to generate a transmit squelch symbol;

a voltage modulator configured to generate an output bias voltage that tracks a root mean square symbol power of a radio frequency signal, the voltage modulator configured to adjust the output bias voltage on symbol boundaries, and the radio frequency signal comprising a representation of the transmit squelch symbol; and a power amplifier configured to receive the output bias voltage and to amplify the radio frequency signal.

2. The system of claim 1, wherein the transmit squelch block is configured to include all zeros in the portion of the symbol to generate the transmit squelch symbol, and wherein the transmit squelch symbol also comprises a cyclic prefix, and a data payload.

3. The system of claim 1, wherein the transmit squelch block is configured to include a non-zero value in the portion of the symbol to generate the transmit squelch symbol, the non-zero value being less than 10% of a maximum value of the portion of the symbol.

4. The system of claim 1, wherein the transmit squelch block is configured to squelch a second portion of a second symbol corresponding to a second symbol boundary, and wherein the second portion is longer than the portion.

5. The system of claim 4, wherein the symbol boundary is associated with an increase in the output bias voltage, and wherein the second symbol boundary associated with a decrease in the output bias voltage.

6. The system of claim 1, wherein the transmit squelch block is configured to squelch on all symbol boundaries of a data stream that includes the symbol.

7. The system of claim 1, wherein the transmit squelch block is configured to selectively squelch on symbol boundaries of a data stream that correspond to the output bias voltage toggling, and wherein the data stream includes the symbol.

8. The system of claim 1, further comprising:

a second transmit squelch block configured to squelch of a portion of a second symbol corresponding to the symbol boundary to generate a second transmit squelch symbol, wherein the second transmit squelch symbol is associated with a different carrier than the transmit squelch symbol;

a first digital upconverter configured to upconvert the transmit squelch symbol; and a second digital upconverter configured to upconvert the second transmit squelch symbol, wherein the radio frequency signal is a composite signal that comprises representations of the transmit squelch symbol and the second transmit squelch symbol.

9. The system of claim 8, wherein the transmit squelch symbol has a longer length than the second transmit squelch symbol, and wherein the voltage modulator is configured to adjust the output bias voltage at symbol boundaries of a first data stream that includes the transmit squelch symbol and to maintain the output bias voltage at symbol boundaries of a second data stream that includes the second transmit squelch symbol that are not aligned with symbol boundaries of the first data stream.

10. The system of claim 9, wherein the second transmit squelch block is configured to squelch symbols of the second data stream corresponding to all of the symbol boundaries of the first data stream.

11. The system of claim 9, wherein the second transmit squelch block is configured to only squelch symbols of the second data stream corresponding to the symbol boundaries of the first data stream where the output bias voltage toggles.

12. A transceiver with transmit squelching at symbol boundaries, the transceiver comprising:

a transmit squelch block configured to squelch a portion of symbol corresponding to a symbol boundary to generate a transmit squelch symbol, wherein the symbol comprises a cyclic prefix, wherein the portion of the symbol is part of the cyclic prefix, and wherein the transmit squelch symbol comprises a cyclic prefix that is shorter than the cyclic prefix of the symbol; and a digital upconverter configured to upconvert the transmit squelch symbol in a digital domain.

13. The transceiver of claim 12, wherein the transmit squelch symbol further comprises a zeroed portion and a data payload, and wherein the zeroed portion includes all zeros.

14. The transceiver of claim 12, wherein the transmit squelch block is configured to squelch a data stream that comprises the symbol on all symbol boundaries of the data stream.

15. The transceiver of claim 12, wherein the transmit squelch block is configured to selectively squelch a data stream on symbol boundaries of the data stream corresponding to a symbol based envelope tracking state changing.

16. The transceiver of claim 12, wherein the transmit squelch block is configured to squelch a second portion of a second symbol corresponding to a second symbol boundary to generate a second transmit squelch symbol, wherein second portion is longer than the portion.

17. The transceiver of claim 12, wherein the transmit squelch block is configured to determine a length of the portion based on a transition between symbol based envelope tracking states.

18. The transceiver of claim 12, further comprising:

a second transmit squelch block configured to squelch a portion of a second symbol corresponding to the symbol boundary to generate a second transmit squelch symbol, the second symbol being associated with a different carrier than the symbol; and a second digital upconverter having an input coupled to an output of the second transmit squelch block;

wherein the transceiver has an output coupled to outputs of the digital upconverter and the second digital upconverter, and wherein the output is configured to provide a composite signal that comprises representations of the transmit squelch symbol and the second transmit squelch symbol.

19. The transceiver of claim 18, wherein the symbol and the second symbol have different lengths, wherein the symbol is included in a first data stream, wherein the second symbol is included in a second data stream, and wherein the transmit squelch block and the second transmit squelch block are configured to squelch on symbol boundaries of the first data stream that are aligned with symbol boundaries of the second data stream.

20. A method of radio frequency signal amplification with symbol based envelope tracking with transmit squelch, the method comprising:

toggling an output bias voltage between a plurality of discrete voltage levels on symbol boundaries of a radio frequency signal based on a symbol based envelope tracking state, wherein the output bias voltage is provided to a power amplifier;

squelching a portion of a symbol to generate a transmit squelch symbol, wherein the portion of the symbol abuts a boundary of the symbol; and after the squelching, amplifying the radio frequency signal with the power amplifier, wherein the radio frequency signal comprises a representation of the transmit squelch symbol.

\* \* \* \* \*